US006658451B1

(12) United States Patent
Chaudhry et al.

(10) Patent No.: US 6,658,451 B1
(45) Date of Patent: *Dec. 2, 2003

(54) PARALLEL JOIN OPERATION TO SUPPORT SPACE AND TIME DIMENSIONAL PROGRAM EXECUTION

(75) Inventors: Shailender Chaudhry, San Francisco, CA (US); Marc Tremblay, Menlo Park, CA (US)

(73) Assignee: Sun Microsystems, Inc., Santa Clara, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/418,625

(22) Filed: Oct. 15, 1999

Related U.S. Application Data

(63) Continuation-in-part of application No. 09/313,229, filed on May 17, 1999, now Pat. No. 6,353,881.

(51) Int. Cl.[7] .................................................. G06F 9/00
(52) U.S. Cl. ........................ 709/108; 709/228; 709/23
(58) Field of Search ................................ 709/102, 107, 709/108; 712/228, 206, 215, 23, 219, 27

(56) References Cited

U.S. PATENT DOCUMENTS

| | | | |
|---|---|---|---|
| 5,410,700 A | 4/1995 | Fecteau et al. ............. 395/700 |
| 5,872,990 A * | 2/1999 | Luick et al. ................... 712/24 |
| 5,923,863 A * | 7/1999 | Adler et al. ................. 712/242 |
| 5,961,639 A * | 10/1999 | Mallick et al. ............. 712/242 |
| 6,079,014 A | 6/2000 | Papworth et al. ........... 712/233 |
| 6,151,706 A * | 11/2000 | Lo et al. ......................... 717/9 |
| 6,182,210 B1 * | 1/2001 | Akkary et al. .............. 712/235 |
| 6,330,661 B1 * | 12/2001 | Torii .......................... 712/228 |
| 6,353,881 B1 * | 3/2002 | Chaudhry et al. .......... 712/228 |
| 6,463,526 B1 * | 10/2002 | Chaudhry et al. .......... 712/228 |

FOREIGN PATENT DOCUMENTS

EP    0 725 334 A1    7/1996    ............. G06F/9/38

* cited by examiner

*Primary Examiner*—Larry D. Donaghue
(74) *Attorney, Agent, or Firm*—Park, Vaughan & Fleming LLP (57) ABSTRACT

One embodiment of the present invention provides a system that supports space and time dimensional program execution by performing a parallel join operation to merge state created during speculative execution into the non-speculative state of a program. The system executes a program using a head thread that operates on primary versions of memory elements and accesses a primary version of a stack. The system also executes the program using a speculative thread that speculatively executes program instructions in advance of the head thread while the head thread is executing. This speculative thread operates on space-time dimensioned versions of the memory elements and accesses a speculative version of the stack. The system performs a join operation between the head thread and the speculative thread when the head thread reaches a point in the program where the speculative thread began executing. This join operation involves using both the head thread and the speculative thread to perform a number of operations in parallel. These operations include merging the space-time dimensioned versions of the memory elements into the primary versions of the memory elements so that updates to the space-time dimensioned versions of the memory elements are incorporated into corresponding primary versions of memory elements. These operations also include merging the speculative version of the stack into the primary version of the stack.

25 Claims, 7 Drawing Sheets

PARALLEL JOIN OPERATION TO SUPPORT SPACE AND TIME DIMENSIONAL PROGRAM EXECUTION

RELATED APPLICATION

This application is a continuation-in-part of pending U.S. patent application Ser. No. 09/313,229 filed on May 17, 1999, now U.S. Pat. No. 6,353,881. This application hereby claims priority under 35 U.S.C. §120 to the above-listed patent application. The application is also related to pending U.S. patent application Ser. No. 09/313,243 filed on May 17, 1999, now U.S. Pat. No. 6,247,027.

BACKGROUND

1. Field of the Invention

The present invention relates to techniques for improving computer system performance. More specifically, the present invention relates to a method and an apparatus that provides a parallel join operation to support space and time dimensional execution of a computer program.

2. Related Art

As increasing semiconductor integration densities allow more transistors to be integrated onto a microprocessor chip, computer designers are investigating different methods of using these transistors to increase computer system performance. Some recent computer architectures exploit "instruction level parallelism," in which a single central processing unit (CPU) issues multiple instructions in a single cycle. Given proper compiler support, instruction level parallelism has proven effective at increasing computational performance across a wide range of computational tasks. However, inter-instruction dependencies generally limit the performance gains realized from using instruction level parallelism to a factor of two or three.

Another method for increasing computational speed is "speculative execution" in which a processor executes multiple branch paths simultaneously, or predicts a branch, so that the processor can continue executing without waiting for the result of the branch operation. By reducing dependencies on branch conditions, speculative execution can increase the total number of instructions issued.

Unfortunately, conventional speculative execution typically provides a limited performance improvement because only a small number of instructions can be speculatively executed. One reason for this limitation is that conventional speculative execution is typically performed at the basic block level, and basic blocks tend to include only a small number of instructions. Another reason is that conventional hardware structures used to perform speculative execution can only accommodate a small number of speculative instructions.

What is needed is a method and apparatus that facilitates speculative execution of program instructions at a higher level of granularity so that many more instructions can be speculatively executed.

One challenge in designing a system that supports speculative execution is to efficiently merge state created during speculative execution into the non-speculative state of the program. If this merging process takes too much time, it can nullify the performance gains derived from speculative execution.

What is needed is a method and an apparatus that efficiently merges state created during speculative execution into the non-speculative state of a program. For efficiency reasons, it is desirable to perform this merging in parallel.

SUMMARY

One embodiment of the present invention provides a system that supports space and time dimensional program execution by performing a parallel join operation to merge state created during speculative execution into the non-speculative state of a program. The system executes a program using a head thread that operates on primary versions of memory elements and accesses a primary version of a stack. The system also executes the program using a speculative thread that speculatively executes program instructions in advance of the head thread while the head thread is executing. This speculative thread operates on space-time dimensioned versions of the memory elements and accesses a speculative version of the stack. The system performs a join operation between the head thread and the speculative thread when the head thread reaches a point in the program where the speculative thread began executing. This join operation involves using both the head thread and the speculative thread to perform a number of operations in parallel. These operations include merging the space-time dimensioned versions of the memory elements into the primary versions of the memory elements so that updates to the space-time dimensioned versions of the memory elements are incorporated into corresponding primary versions of memory elements. These operations also include merging the speculative version of the stack into the primary version of the stack.

In one embodiment of the present invention, during the join operation the head thread merges the speculative version of the stack into the primary version of the stack while the speculative thread merges the space-time dimensioned versions of the memory elements into the primary versions of the memory elements.

In one embodiment of the present invention, if the head thread finishes merging the speculative version of the stack before the speculative thread finishes merging the space-time dimensioned versions of the memory elements, the head thread helps the speculative thread in merging the space-time dimensioned versions of the memory elements into the primary versions of the memory elements.

In one embodiment of the present invention, if the speculative thread finishes merging the space-time dimensioned versions of the memory elements before the head thread finishes merging the speculative version of the stack, the speculative thread helps the head thread in merging the speculative version of the stack into the primary version of the stack.

In one embodiment of the present invention, the head thread continues executing the program as a pseudo-head thread that operates on the space-time dimensioned versions of the memory elements using the speculative version of the stack. At the same time, the speculative thread merges the space-time dimensioned versions of the memory elements into the primary versions of the memory elements.

In one embodiment of the present invention, merging the speculative version of the stack into the primary version of the stack includes inserting a stub at the bottom of the speculative version of the stack. If the pseudo-head thread encounters the stub (upon return from the method whose frame was previously copied), the pseudo-head thread copies an additional frame from the primary version of the stack to the speculative version of the stack in place of the stub, and moves the stub below the additional frame.

DETAILED DESCRIPTION

The following description is presented to enable any person skilled in the art to make and use the invention, and is provided in the context of a particular application and its requirements. Various modifications to the disclosed embodiments will be readily apparent to those skilled in the art, and the general principles defined herein may be applied to other embodiments and applications without departing from the spirit and scope of the present invention. Thus, the present invention is not intended to be limited to the embodiments shown, but is to be accorded the widest scope consistent with the principles and features disclosed herein.

The data structures and code described in this detailed description are typically stored on a computer readable storage medium, which may be any device or medium that can store code and/or data for use by a computer system. This includes, but is not limited to, magnetic and optical storage devices such as disk drives, magnetic tape, CDs (compact discs) and DVDs (digital video discs), and computer instruction signals embodied in a carrier wave. For example, the carrier wave may carry information across a communications network, such as the Internet.

Computer System

Figure 1:
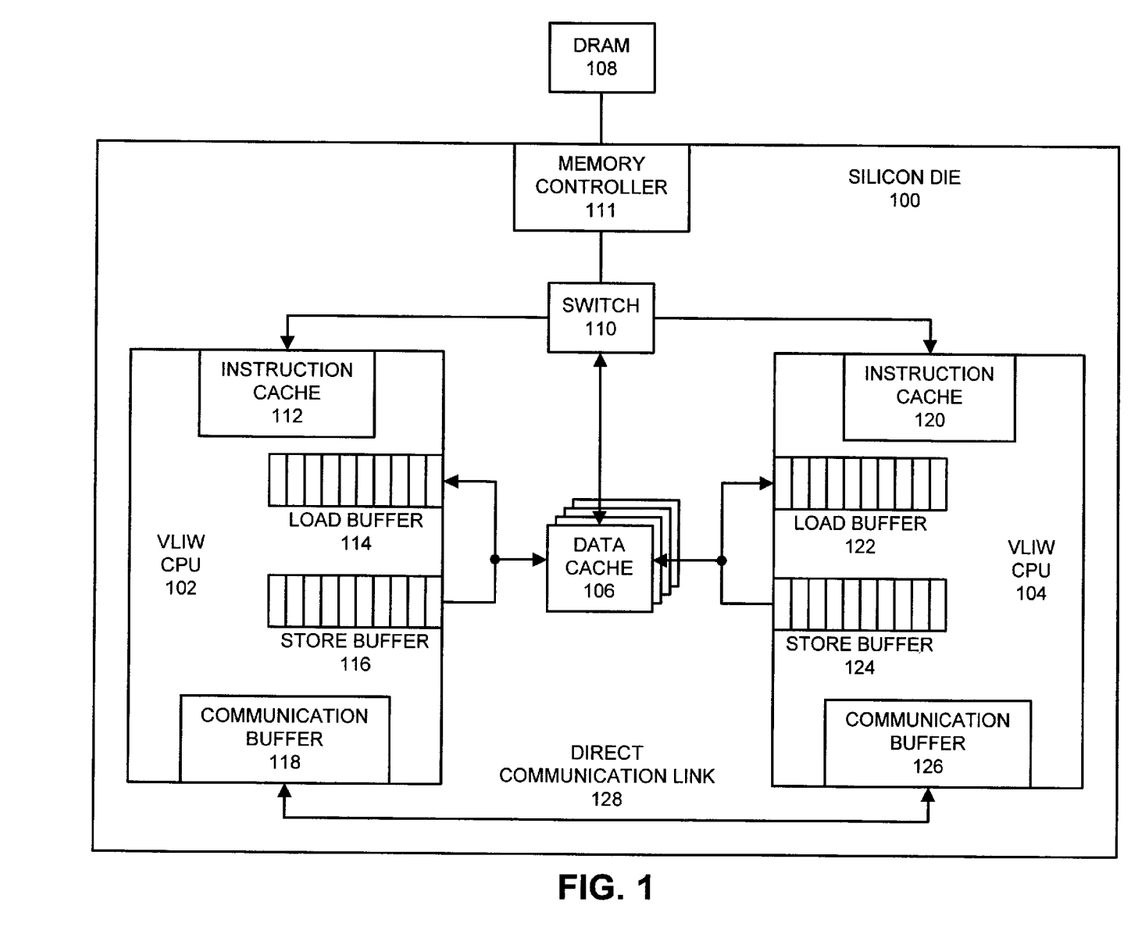
FIG. 1 illustrates a computer system including two central processing units sharing a common data cache in accordance with an embodiment of the present invention.

FIG. 1 illustrates a computer system including two central processing units (CPUs) 102 and 104 sharing a common data cache 106 in accordance with an embodiment of the present invention. In this embodiment, CPUs 102 and 104 and data cache 106 reside on silicon die 100. Note that CPUs 102 and 104 may generally be any type of computational devices that allow multiple threads to execute concurrently. In the embodiment illustrated in FIG. 1, CPUs 102 and 104 are very long instruction word (VLIW) CPUs, which support concurrent execution of multiple instructions executing on multiple functional units. VLIW CPUs 102 and 104 include instruction caches 112 and 120, respectively, containing instructions to be executed by VLIW CPUs 102 and 104.

VLIW CPUs 102 and 104 additionally include load buffers 114 and 122 as well as store buffers 116 and 124 for buffering communications with data cache 106. More specifically, VLIW CPU 102 includes load buffer 114 for buffering loads received from data cache 106, and store buffer 116 for buffering stores to data cache 106. Similarly, VLIW CPU 104 includes load buffer 122 for buffering loads received from data cache 106, and store buffer 124 for buffering stores to data cache 106.

VLIW CPUs 102 and 104 are additionally coupled together by direct communication link 128, which facilitates rapid communication between VLIW CPUs 102 and 104. Note that direct communication link 128 allows VLIW CPU 102 to write into communication buffer 126 within VLIW CPU 104. It also allows VLIW CPU 104 to write into communication buffer 118 within VLIW CPU 102.

In the embodiment illustrated in FIG. 1, Data cache 106 is fully dual-ported allowing concurrent read and/or write accesses from VLIW CPUs 102 and 104. This dual porting eliminates cache coherence delays associated with conventional shared memory architectures that rely on coherent caches.

In one embodiment of the present invention, data cache 106 is a 16K byte 4-way set-associative data cache with 32 byte cache lines.

Data cache 106, instruction caches 112 and instruction cache 120 are coupled through switch 110 to memory controller 111. Memory controller 111 is coupled to dynamic random access memory (DRAM) 108, which is located off chip. Switch 110 may include any type of circuitry for switching signal lines. In one embodiment of the present invention, switch 110 is a cross bar switch.

The present invention generally applies to any computer system that supports concurrent execution by multiple threads and is not limited to the illustrated computing system. However, note that data cache 106 supports fast accesses to shared data items. These fast accesses facilitate efficient sharing of status information between VLIW CPUs 102 and 104 to keep track of accesses to versions of memory objects.

Space-Time Dimensional Execution of Methods

Figure 2A:
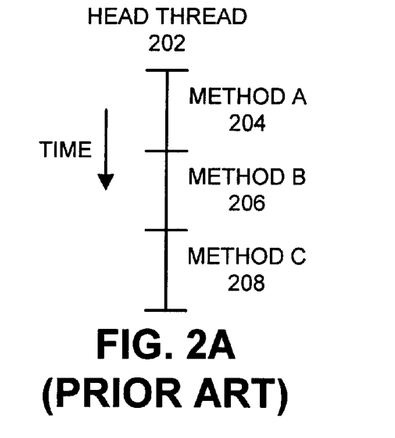
FIG. 2A illustrates sequential execution of methods by a single thread.

FIG. 2A illustrates sequential execution of methods in a conventional computer system by a single head thread 202. In executing a program, head thread 202 executes a number of methods in sequence, including method A 204, method B 206 and method C 208.

Figure 2B:
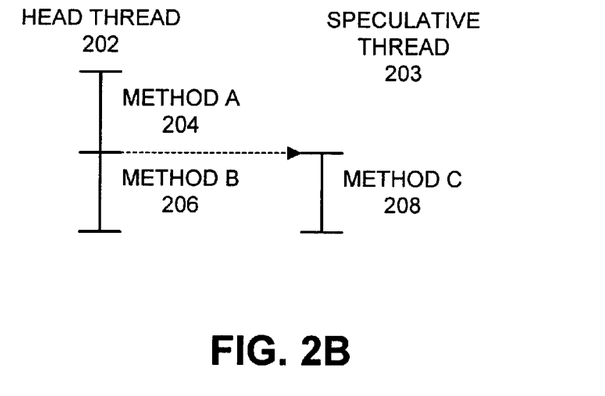
FIG. 2B illustrates space and time dimensional execution of a method in accordance with an embodiment of the present invention.

In contrast, FIG. 2B illustrates space and time dimensional execution of a method in accordance with an embodiment of the present invention. In FIG. 2B, head thread 202 first executes method A 204 and then executes method B 206. (For this example, assume that method B 206 returns a void or some other value that is not used by method C 208. Alternatively, if method C 208 uses a value returned by method B206, assume that method C 208 uses a predicted return value from method B 206.)

As head thread 202 executes method B 206, speculative thread 203 executes method C 208 in a separate space-time dimension of the heap. If head thread 202 successfully executes method B 206, speculative thread 203 is joined with head thread 202. This join operation involves causing state associated with the speculative thread 203 to be merged with state associated with the head thread 202 and the collapsing of the space-time dimensions of the heap.

If speculative thread 203 for some reason encounters problems in executing method C 208, speculative thread 203 performs a rollback operation. This rollback operation allows speculative thread 203 to reattempt to execute method C 208. Alternatively, head thread 202 can execute method C 208 non-speculatively and speculative thread 203 can execute a subsequent method.

There are a number of reasons why speculative thread 203 may encounter problems in executing method C 208. One problem occurs when head thread 202 executing method B 206 writes a value to a memory element (object) after speculative thread 203 has read the same memory element. The same memory element can be read when the two space-time dimensions of the heap are collapsed at this memory element at the time of the read by speculative thread 203. In this case, speculative thread 203 should have read the value written by head thread 202, but instead has read a previous value. In this case, the system causes speculative thread 203 to roll back so that speculative thread 203 can read the value written by head thread 202.

Note that the term "memory element" generally refers to any unit of memory that can be accessed by a computer program. For example, the term "memory element" may refer to a bit, a byte or a word memory, as well as a data structure or an object defined within an object-oriented programming system.

Figure 3:
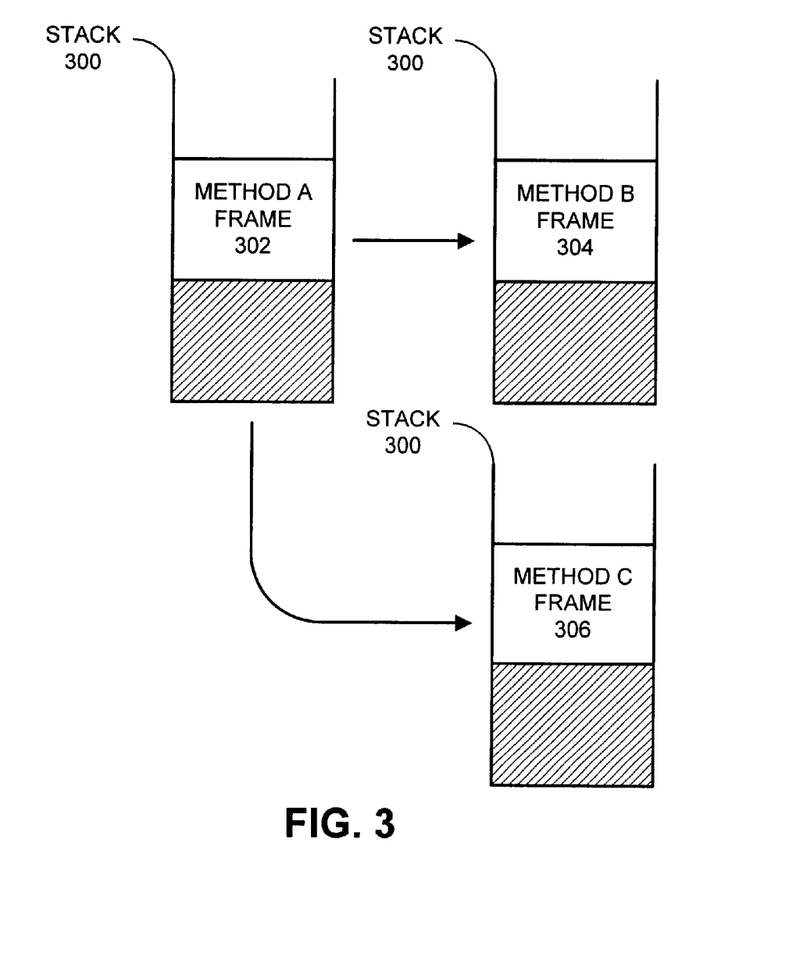
FIG. 3 illustrates the state of the system stack during space and time dimensional execution of a method in accordance with an embodiment of the present invention.

FIG. 3 illustrates the state of the system stack during space and time dimensional execution of a method in accordance with an embodiment of the present invention. Note that since programming languages such as the Java programming language do not allow a method to modify the stack frame of another method, the system stack will generally be the same before method B 206 is executed as it is before method C 208 is executed. (This is not quite true if method B 206 returns a parameter through the system stack. However, return parameters are can be explicitly dealt with as is described below.) Referring the FIG. 3, stack 300 contains method A frame 302 while method A 204 is executing. When method A 204 returns, method B 206 commences and method A frame 302 is replaced by method B frame 304. Finally, when method B 206 returns, method C 208 commences and method B frame 304 is replaced by method C frame 306. Note that since stack 300 is the same immediately before method B 206 executed as it is immediately before method C 208 is executed, it is possible to execute method C 208 using a copy of stack 300 without first executing method B 206.

In order to undo the results of speculatively executed operations, updates to memory need to be versioned. The overhead involved in versioning all updates to memory can be prohibitively expensive due to increased memory requirements, decreased cache performance and additional hardware required to perform the versioning.

Fortunately, not all updates to memory need to be versioned. For example, updates to local variables—such as a loop counter—on a system stack are typically only relevant to the thread that is updating the local variables. Hence, even for speculative threads versioning updates to these local variables is not necessary.

When executing programs written in conventional programming languages, such as C, it is typically not possible to determine which updates are related to the heap, and which updates are related to the system stack. These programs are typically compiled from a high-level language representation into executable code for a specific machine architecture. This compilation process typically removes distinctions between updates to heap and system stack.

The same is not true for new platform-independent computer languages, such as the JAVA™ programming language distributed by SUN Microsystems, Inc. of Palo Alto, Calif. (Sun, the Sun logo, Sun Microsystems, and Java are trademarks or registered trademarks of Sun Microsystems, Inc. in the United States and other countries.) A program written in the Java programming language is typically compiled into a class file containing Java byte codes. This class file can be transmitted over a computer network to a distant computer system to be executed on the distant computer system. Java byte codes are said to be "platform-independent," because they can be executed across a wide range of computing platforms, so long as the computing platforms provide a Java virtual machine.

A Java byte code can be executed on a specific computing platform by using an interpreter or a just in time (JIT) compiler to translate the Java byte code into machine code for the specific computing platform. Alternatively, a Java byte code can be executed directly on a Java byte code engine running on the specific computing platform.

Fortunately, a Java byte code contains more syntactic information than conventional machine code. In particular, the Java byte codes differentiate between accesses to local variables in the system stack and accesses to the system heap. Furthermore, programs written in the Java programming language do not allow conversion between primitive and reference types. Such conversion can make it hard to differentiate accesses to the system stack from accesses to the system heap at compile time.

Data Structures to Support Space-Time Dimensional Execution

Figure 4:
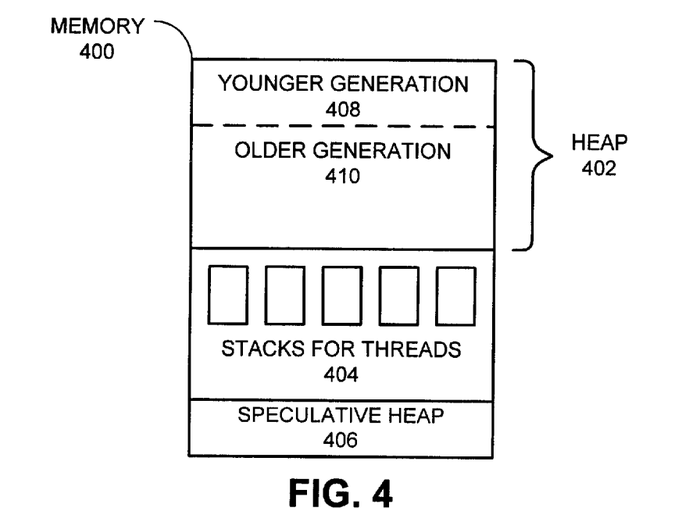
FIG. 4 illustrates how memory is partitioned between stack and heap in accordance with an embodiment of the present invention.
Figure 5:
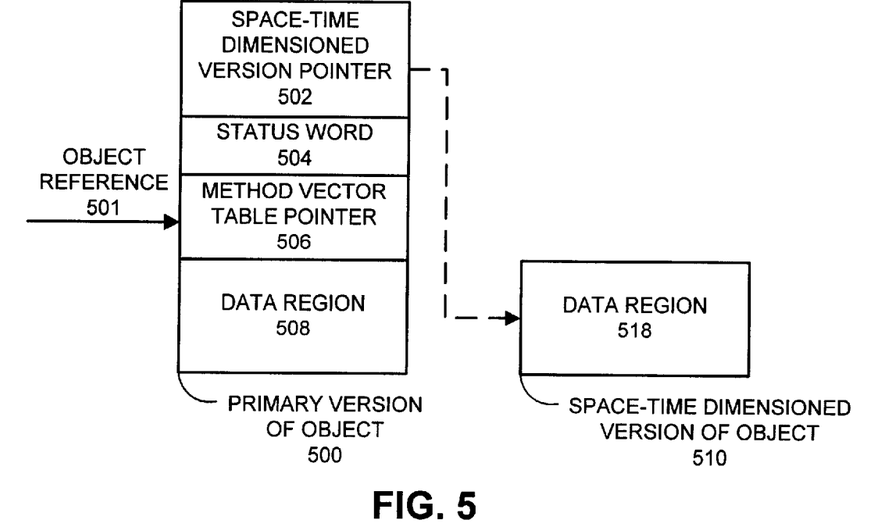
FIG. 5 illustrates the structure of a primary version and a space-time dimensioned version of an object in accordance with an embodiment of the present invention.

FIG. 4 illustrates how memory is partitioned between stack and heap in accordance with an embodiment of the present invention. In FIG. 4, memory 400 is divided into a number of regions including heap 402, stacks for threads 404 and speculative heap 406. Heap 402 comprises a region of memory from which objects are allocated. Heap 402 is further divided into younger generation region 408 and older generation region 410 for garbage collection purposes. For performance reasons, garbage collectors typically treat younger generation objects differently from older generation objects. Stack for threads 404 comprises a region of memory from which stacks for various threads are allocated. Speculative heap 406 contains the space-time dimensioned values of all memory elements where the two space-time dimensions of the heap are not collapsed. This includes space-time dimensional versions of objects, for example, version 510 of object 500 as shown in FIG. 5, and objects created by speculative thread 203. For garbage collection purposes, these objects created by speculative thread 203 can be treated as belonging to a generation that is younger than objects within younger generation region 408.

FIG. 5 illustrates the structure of a primary version of object 500 and a space-time dimensioned version of object 510 in accordance with an embodiment of the present invention.

Primary version of object 500 is referenced by object reference pointer 501. Like any object defined within an object-oriented programming system, primary version of object 500 includes data region 508, which includes one or more fields containing data associated with primary version of object 500. Primary version of object 500 also includes method vector table pointer 506. Method vector table pointer 506 points to a table containing vectors that point to the methods that can be invoked on primary version of object 500.

Primary version of object 500 also includes space-time dimensioned version pointer 502, which points to space-time dimensioned version of object 510, if the two space-time dimensions are not collapsed at this object. Note that in the illustrated embodiment of the present invention, space-time dimensioned version 510 is always referenced indirectly through space-time dimensioned version pointer 502. Primary version of object 500 additionally includes status word 504, which contains status information specifying which fields from data region 508 have been written to or read by speculative thread 203. Space-time dimensioned version of object 510 includes only data region 518.

Figure 6:
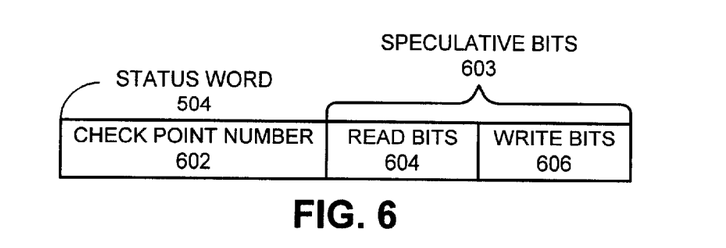
FIG. 6 illustrates the structure of a status word for an object in accordance with an embodiment of the present invention.

FIG. 6 illustrates the structure of status word 504 in accordance with an embodiment of the present invention. In this embodiment, status word 504 includes checkpoint number 602 and speculative bits 603. Speculative bits 603 includes read bits 604 and write bits 606. When status word 504 needs to be updated due to a read or a write by speculative thread 203, checkpoint number 602 is updated with the current time of the system. The current time in the time dimension of the system is advanced discretely at a join or a rollback. This allows checkpoint number 602 to be used as a qualifier for speculative bits 603. If checkpoint number 602 is less than the current time, speculative bits 603 can be interpreted as reset.

Read bits 604 keep track of which fields within data region 508 have been read since the last join or rollback. Correspondingly, write bits 606 keep track of which fields within data region 508 have been written since the last join or rollback. In one embodiment of the present invention, read bits 604 includes one bit for each field within data region 508. In another embodiment, read bits includes fewer bits than the number of fields within data region 508. In this embodiment, each bit within read bits 604 corresponds to more than one field in data region 508. For example, if there are eight read bits, each bit corresponds to every eighth field. Write bits 606 similarly can correspond to one or multiple fields within data region 508.

Space-Time Dimensional Update Process

Space-time dimensioning occurs during selected memory updates. For local variable and operand accesses to the system stack, no space-time dimensioned versions exist and nothing special happens. During read operations by head thread 202 to objects in the heap 402, again nothing special happens.

Special operations are involved in write operations by head thread 202 as well as read and write operations by speculative thread 203. These special operations are described in more detail with reference to FIGS. 7, 8 and 9 below.

Figure 7:
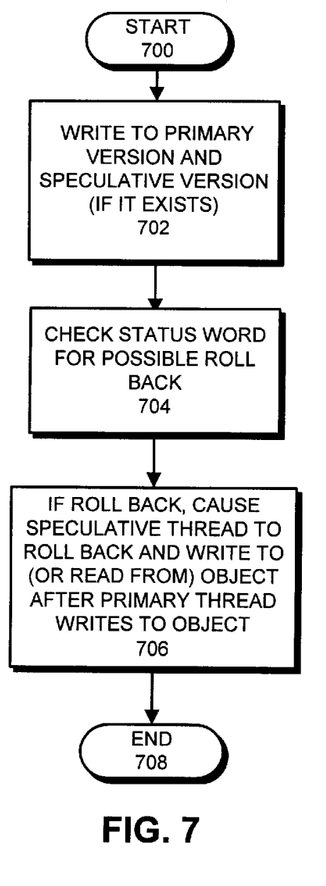
FIG. 7 is a flow chart illustrating operations involved in performing a write to a memory element by a head thread in accordance with an embodiment of the present invention.

FIG. 7 is a flow chart illustrating operations involved in a write operation to an object by a head thread 202 in accordance with an embodiment of the present invention. The system writes to the primary version of object 500 and the space-time dimensioned version of object 510 if the two space-time dimensions are not collapsed at this point (step 702). Next, the system checks status word 504 within primary version of object 500 to determine whether a rollback is required (step 704). A rollback is required if speculative thread 203 previously read the data element. The same memory element can be read when the two space-time dimensions of the heap are collapsed at this memory element at the time of the read by speculative thread 203. A rollback is also required if speculative thread 203 previously wrote to the object and thus ensured that the two dimensions of the object are not collapsed at this element, and if the current write operation updates both primary version of object 500 and space-time dimensioned version of object 510.

If a rollback is required, the system causes speculative thread 203 to perform a rollback operation (step 706). This rollback operation allows speculative thread 203 to read from (or write to) the object after head thread 202 writes to the object.

Note that in the embodiment of the present invention illustrated in FIG. 7 the system performs writes to both primary version 500 and space-time dimensioned version 510. In an alternative embodiment, the system first checks to determine if speculative thread 203 previously wrote to space-time dimensioned version 510. If not, the system writes to both primary version 500 and space-time dimensioned version 510. If so, the system only writes to primary version 500.

Figure 8:
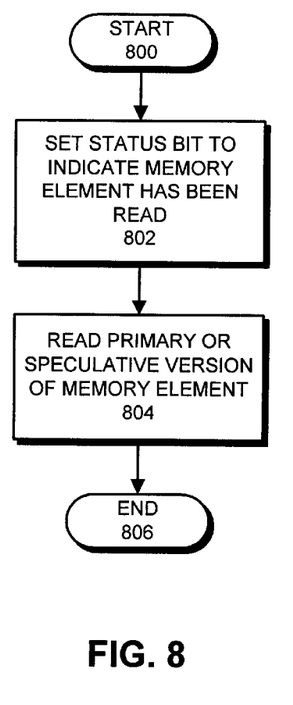
FIG. 8 is a flow chart illustrating operations involved in performing a read to a memory element by a speculative thread in accordance with an embodiment of the present invention.

FIG. 8 is a flow chart illustrating operations involved in a read operation to an object by speculative thread 203 in accordance with an embodiment of the present invention. During this read operation, the system sets a status bit in status word 504 within primary version of object 500 to indicate that primary version 500 has been read (step 802). Speculative thread 203 then reads space-time dimensioned version 510, if it exists. Otherwise, speculative thread 203 reads primary version 500.

Figure 9:
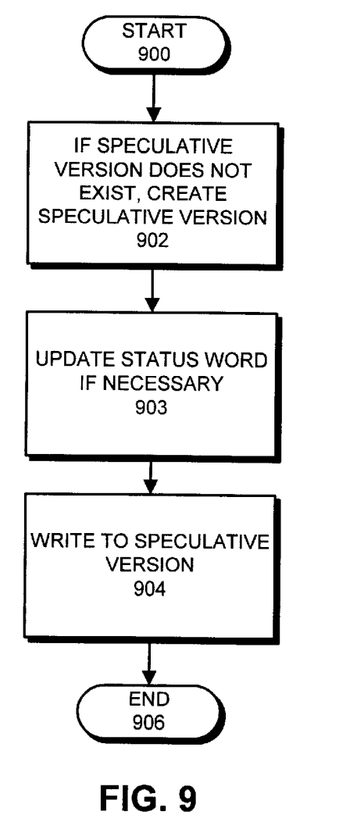
FIG. 9 is a flow chart illustrating operations involved in performing a write to a memory element by a speculative thread in accordance with an embodiment of the present invention.

FIG. 9 is a flow chart illustrating operations involved in a write operation to a memory element by speculative thread 203 in accordance with an embodiment of the present invention. If a space-time dimensioned version 510 does not exist, the system creates a space-time dimensioned version 510 in speculative heap 406 (step 902). The system also updates status word 504 to indicate that speculative thread 203 has written to the object if such updating is necessary (step 903). The system next writes to space-time dimensioned version 510 (step 904). Such updating is necessary if head thread 202 must subsequently choose between writing to both primary version 500 and space-time dimensioned version 510, or writing only to primary version 500 as is described above with reference to FIG. 7.

Figure 10:
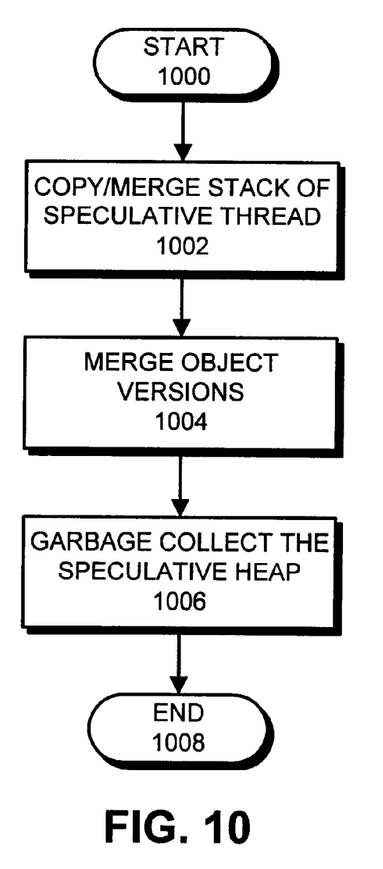
FIG. 10 is a flow chart illustrating operations involved in performing a join between a head thread and a speculative thread in accordance with an embodiment of the present invention.

FIG. 10 is a flow chart illustrating operations involved in a join operation between head thread 202 and a speculative thread 203 in accordance with an embodiment of the present invention. A join operation occurs for example when head thread 202 reaches a point in the program where speculative thread 203 began executing. The join operation causes state associated with the speculative thread 203 to be merged with state associated with the head thread 202. This involves copying and/or merging the stack of speculative thread 203 into the stack of head thread 202 (step 1002). It also involves merging space-time dimension and primary versions of objects (step 1004) as well as possibly garbage collecting speculative heap 406 (step 1006). In one embodiment of the present invention, one of threads 202 or 203 performs steps 1002 and 1006, while the other thread performs step 1004.

Figure 11:
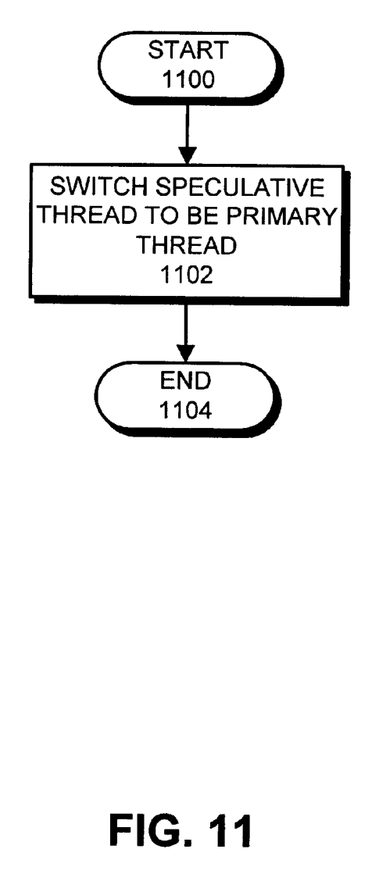
FIG. 11 is a flow chart illustrating operations involved in performing a join between a head thread and a speculative thread in accordance with another embodiment of the present invention.

FIG. 11 is a flow chart illustrating operations involved in a join operation between head thread 202 and a speculative thread 203 in accordance with another embodiment of the present invention. In this embodiment, speculative thread 203 carries on as a pseudo-head thread. As a pseudo-head thread, speculative thread 203 uses indirection to reference space-time dimensioned versions of objects, but does not mark objects or create versions. While speculative thread 203 is acting as a pseudo-head thread, head thread 202 updates primary versions of objects.

Parallel Join Operation

Figure 12:
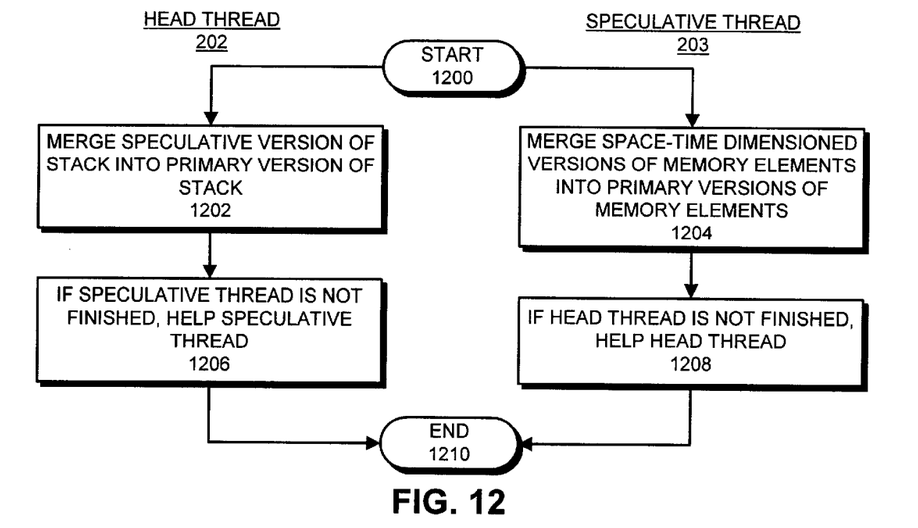
FIG. 12 is a flow chart illustrating a parallel join operation in accordance with an embodiment of the present invention.

FIG. 12 is a flow chart illustrating a parallel join operation in accordance with an embodiment of the present invention. This flow chart illustrates in more detail the process that is described above with reference to FIG. 10. The system first initiates the parallel join operation (step 1200). As mentioned above, a join operation can occur when head thread 202 reaches a point in the program where speculative thread 203 began executing. During this join operation, head thread 202 merges the speculative version of the program stack into the primary version of the program stack (step 1202). At the same time, speculative thread 203 merges the space-time dimensioned versions of memory elements into corresponding primary versions of memory elements (step 1204). This may include resetting space-time dimensioned version pointer 502 to point back to the primary version of the object 500 after the merging is complete (see FIG. 5).

Note that head thread 202 and speculative thread 203 are interchangeable. Head thread 202 can just as easily merge versions of memory elements while speculative thread 203 merges versions of the stack.

If head thread 202 finishes merging versions of the stack before speculative thread 203 finishes merging versions of memory elements, head thread 202 helps speculative thread 203 in merging versions of memory elements (step 1206). Note that speculative thread 203 can start at a first end of a list of memory elements to be merged and can proceed to a second end, while head thread 202 starts at the second end and proceeds to the first end. Also note that the merging process will operate properly even if head thread 202 repeats some of the same work that is completed by speculative thread 203, because head thread 202 and speculative thread 203 will write the same values during the merging process. Thus, there is no need to synchronize between the two threads using atomic instructions.

If speculative thread 203 finishes merging versions of memory elements before head thread 202 finishes merging versions of the stack, speculative thread 203 can similarly help head thread 202 in merging versions of the stack (step 1208).

Pseudo-Head Thread

Figure 13:
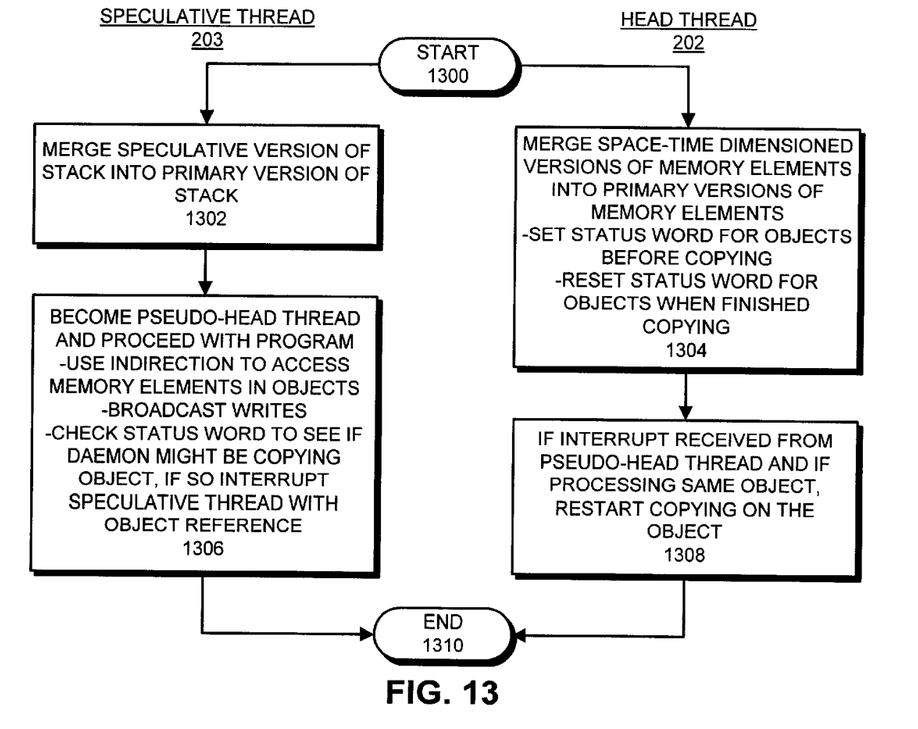
FIG. 13 is a flow chart illustrating a parallel join operation involving a pseudo-head thread in accordance with an embodiment of the present invention.

FIG. 13 is a flow chart illustrating a parallel join operation involving pseudo-head 202 thread in accordance with an embodiment of the present invention. In this embodiment, speculative thread 203 merges the speculative version of the program stack into the primary version of the program stack (step 1302). When this is done, speculative thread 203 becomes a pseudo-head thread and continues to execute the program as if the join operation had completed (step 1306). In this case, since head thread 202 has not completed merging the space-time dimensioned versions of memory elements in the primary versions of memory elements, pseudo-head thread uses indirection to access memory elements. This ensures that pseudo-head thread operates on only the latest versions of memory elements, as if the join operation had completed.

Pseudo-head thread also broadcasts write operations to both primary and space-time dimensioned versions of memory elements. This can potentially interfere with the actions of head thread 202 in merging space-time dimensioned versions of memory elements into primary versions of memory elements. To prevent problems due to such interference, during write operations pseudo-head thread checks status word 504 of an object to see if head thread 202 might be copying the same object. If status word 504 indicates that they may be copying the same object, pseudo-head thread interrupts head thread 202 with the object reference.

While speculative thread 203 is merging the speculative version of the stack and is operating as pseudo-head thread, head thread 202 merges the space-time dimensioned versions of memory elements into corresponding primary versions of memory elements (step 1304). To prevent interference by pseudo-head thread, head thread 202 sets status word 504 for an object to indicate that the object is being copied before the object is copied. When head thread 202 is finished copying the object, head thread 202 resets status word 504 to indicate the object is not being copied.

If head thread 202 receives an interrupt with an object reference from pseudo-head thread, head thread 202 examines the object reference to determine if pseudo-head thread is processing the same object as head thread 202. If so, head thread 202 restarts copying the object to undo any write conflicts that may have occurred.

Note during the join operation, the roles of speculative thread 203 and head thread 202 could have been reversed. Head thread 202 can perform the merging of stack versions and can act as a pseudo-head thread while specualtive thread 203 merges the versions of memory elements.

In one embodiment of the present invention, speculative thread 203 skips the step of merging the versions of the stack. In this embodiment, speculative thread 203 immediately becomes pseudo-head thread and continues executing the program. Pseudo-head thread uses the speculative version of the stack. This speculative version of the stack includes a stub that causes stack frames to be copied over from the primary version of the stack as needed. This process is described in more detail below with reference to FIG. 14.

Figure 14:
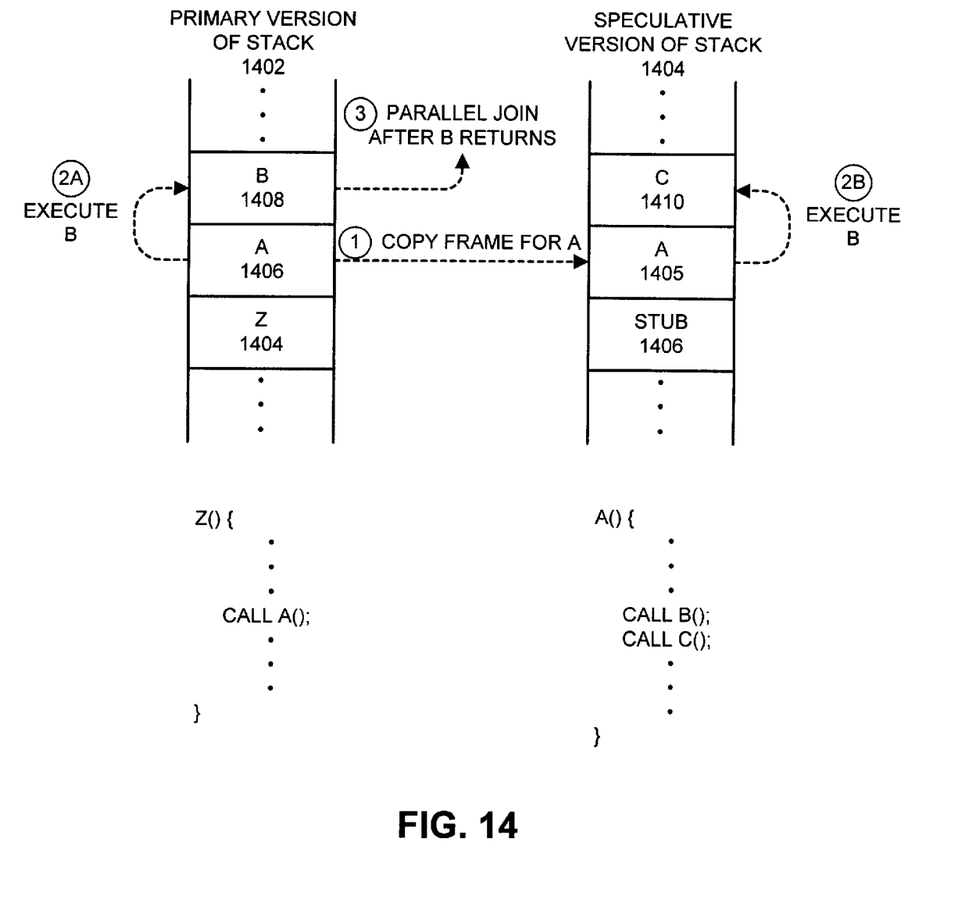
FIG. 14 illustrates how a stub can be used in a speculative version of a stack in accordance with an embodiment of the present invention.

Note that pseudo-head thread uses a different version of the program than speculative thread 203 because pseudo-head thread does not perform the same marking operations a speculative thread 203. Hence, pseudo-head thread requires its own version of the program.

Speculative Version of Stack

FIG. 14 illustrates a example of how a stub can be used in a speculative version of a stack in accordance with an embodiment of the present invention. In this example, method (or function) Z( ) calls method A( ). Method A( ) then calls methods B( ) and method C( ).

During execution, while head thread 202 begins executing method B( ), speculative thread 203 begins executing method C( ). Note that speculative thread 203 must have its own speculative version of stack 1404. The overhead involved in copying the entire stack can be quite high. So instead of copying all of the primary version of stack 1402, speculative thread 203 copies only a single frame for method A( ). Recall that method A( ) called method C( ). Speculative thread 203 places stub 1406 below the frame for method A( ).

Now suppose head thread completes method B( ). In one embodiment of the present invention, speculative thread 203 becomes pseudo-head thread and continues executing method C( ) from the point where head thread 202 left off. Head thread 202 stops executing method C( ) and performs a join operation by merging versions of memory elements. In this case, the speculative version of the stack 1404 is not merged with the primary version of stack 1402. Instead, pseudo-head thread uses speculative version of stack 1404. When pseudo-head thread eventually completes method C( ), it returns to method A( ) and uses the stack frame for method A( ). When head thread 202 eventually completes method A( ) it returns to method Z( ). However, the stack frame for method Z( ) is not present on speculative version of stack 1404. Instead, pseudo-head thread encounters stub 1406, which causes pseudo-head thread to copy the frame for method Z( ) to speculative version of stack 1404. After this is done, stub 1406 is placed below the frame for method Z( ). If method Z( ) returns, the process is repeated for the method that called method Z( ). In this way, the system only copies stack frames over from primary version of stack 1402 to speculative version of stack 1404 as the frames are required by pseudo-head thread.

The foregoing descriptions of embodiments of the invention have been presented for purposes of illustration and description only. They are not intended to be exhaustive or to limit the invention to the forms disclosed. Accordingly, many modifications and variations will be apparent to practitioners skilled in the art. Additionally, the above disclosure is not intended to limit the invention. The scope of the invention is defined by the appended claims.

What is claimed is:

1. A method for performing a parallel join operation to merge state created during speculative execution into the non-speculative state of a program during space and time dimensional program execution, comprising:
   executing the program using a head thread, the head thread operating on primary versions of memory elements and accessing a primary version of a stack;
   executing the program using a speculative thread that speculatively executes program instructions in advance of the head thread while the head thread is executing, the speculative thread operating on space-time dimensioned versions of the memory elements and accessing a speculative version of the stack; and
   performing a join operation between the head thread and the speculative thread when the head thread reaches a point in the program where the speculative thread began executing, the join operation involving performing operations in parallel using both the head thread and the speculative thread, the operations including,
   merging the space-time dimensioned versions of the memory elements into the primary versions of the memory elements so that updates to the space-time dimensioned versions of the memory elements are incorporated into corresponding primary versions of memory elements, and
   merging the speculative version of the stack into the primary version of the stack.

2. The method of claim 1, wherein during the join operation, the head thread merges the speculative version of the stack into the primary version of the stack while the speculative thread merges the space-time dimensioned versions of the memory elements into the primary versions of the memory elements.

3. The method of claim 2, wherein if the head thread finishes merging the speculative version of the stack before the speculative thread finishes merging the space-time dimensioned versions of the memory elements, the head thread helps the speculative thread in merging the space-time dimensioned versions of the memory elements into the primary versions of the memory elements.

4. The method of claim 2, wherein if the speculative thread finishes merging the space-time dimensioned versions of the memory elements before the head thread finishes merging the speculative version of the stack, the speculative thread helps the head thread in merging the speculative version of the stack into the primary version of the stack.

5. The method of claim 2, wherein if the head thread finishes merging the speculative version of the stack before the speculative thread finishes merging the space-time dimensioned versions of the memory elements, the head thread continues executing the program as a pseudo-head thread that operates on the space-time dimensioned versions of the memory elements using the speculative version of the stack while the speculative thread finishes merging the space-time dimensioned versions of the memory elements.

6. The method of claim 1, wherein the head thread continues executing the program as a pseudo-head thread that operates on the space-time dimensioned versions of the memory elements using the speculative version of the stack while the speculative thread merges the space-time dimensioned versions of the memory elements into the primary versions of the memory elements.

7. The method of claim 6, wherein merging the speculative version of the stack with the primary version of the stack includes inserting a stub at the bottom of the speculative version of the stack so that if the pseudo-head thread encounters the stub, the pseudo-head thread copies an additional frame from the primary version of the stack to the speculative version of the stack in place of the stub and moves the stub below the additional frame.

8. The method of claim 6, wherein the speculative thread modifies a status word associated with a memory element after the speculative thread finishes merging the memory element so that the head thread can avoid a race condition with the speculative thread during a write operation to the memory element.

9. The method of claim 1, wherein the memory elements include objects defined within an object-oriented programming system.

10. The method of claim 1, wherein accesses to a space-time dimensioned version of a memory element are made indirectly through a pointer associated with a corresponding primary version of the memory element.

11. The method of claim 10, wherein the pointer points to the primary version of the memory element if the space-time dimensioned version of the memory element does not exist.

12. The method of claim 1, wherein the speculative thread continues executing the program as a pseudo-head thread that operates on the space-time dimensioned versions of the memory elements using the speculative version of the stack.

13. An apparatus that performs a parallel join operation to merge state created during speculative execution into the non-speculative state of a program during space and time dimensional program execution, comprising:
   a head thread that executes program instructions, the head thread operating on primary versions of memory elements and accessing a primary version of a stack;
   a speculative thread that executes program instructions in advance of the head thread while the head thread is executing, the speculative thread operating on space-time dimensioned versions of the memory elements and accessing a speculative version of the stack;
   a join mechanism that performs a join operation between the head thread and the speculative thread when the head thread reaches a point in the program where the speculative thread began executing, the join mechanism being configured to perform operations in parallel using both the head thread and the speculative thread, the operations including,
   merging the space-time dimensioned versions of the memory elements into the primary versions of the memory elements so that updates to the space-time dimensioned versions of the memory elements are incorporated into corresponding primary versions of memory elements, and merging the speculative version of the stack into the primary version of the stack.

14. The apparatus of claim 13, wherein the join mechanism is configured to use the head thread to merge the speculative version of the stack into the primary version of the stack while the speculative thread merges the space-time dimensioned versions of the memory elements into the primary versions of the memory elements.

15. The apparatus of claim 14, wherein the join mechanism is configured to allow the head thread to help the speculative thread in merging the space-time dimensioned versions of the memory elements into the primary versions of the memory elements if the head thread finishes merging the speculative version of the stack before the speculative thread finishes merging the space-time dimensioned versions of the memory elements.

16. The apparatus of claim 14, wherein the join mechanism is configured to allow the head thread to continue executing the program as a pseudo-head thread that operates on the space-time dimensioned versions of the memory elements using the speculative version of the stack while the speculative thread finishes merging the space-time dimensioned versions of the memory elements, if the head thread finishes merging the speculative version of the stack before the speculative thread finishes merging the space-time dimensioned versions of the memory elements.

17. The apparatus of claim 13, wherein the join mechanism is configured to allow the head thread to continue executing the program as a pseudo-head thread that operates on the space-time dimensioned versions of the memory elements using the speculative version of the stack while the speculative thread merges the space-time dimensioned versions of the memory elements into the primary versions of the memory elements.

18. The apparatus of claim 17, wherein merging the speculative version of the stack with the primary version of the stack includes inserting a stub at the bottom of the speculative version of the stack so that if the pseudo-head thread encounters the stub, the pseudo-head thread copies an additional frame from the primary version of the stack to the speculative version of the stack in place of the stub and moves the stub below the additional frame.

19. The apparatus of claim 17, wherein the speculative thread modifies a status word associated with a memory element after the speculative thread finishes merging the memory element so that the head thread can avoid a race condition with the speculative thread during a write operation to the memory element.

20. The apparatus of claim 13, wherein the memory elements include objects defined within an object-oriented programming system.

21. The apparatus of claim 13, wherein the join mechanism is configured to allow the speculative thread to continue executing the program as a pseudo-head thread that operates on the space-time dimensioned versions of the memory elements using the speculative version of the stack.

22. A computer-readable storage medium storing instructions that when executed by a computer cause the computer to perform a method for performing a parallel join operation to merge state created during speculative execution into the non-speculative state of a program during space and time dimensional program execution, the method comprising:

executing the program using a head thread, the head thread operating on primary versions of memory elements and accessing a primary version of a stack;

executing the program using a speculative thread that speculatively executes program instructions in advance of the head thread while the head thread is executing, the speculative thread operating on space-time dimensioned versions of the memory elements and accessing a speculative version of the stack; and performing a join operation between the head thread and the speculative thread when the head thread reaches a point in the program where the speculative thread began executing, the join operation involving performing operations in parallel using both the head thread and the speculative thread, the operations including, merging the space-time dimensioned versions of the memory elements into the primary versions of the memory elements so that updates to the space-time dimensioned versions of the memory elements are incorporated into corresponding primary versions of memory elements, and merging the speculative version of the stack into the primary version of the stack.

23. The computer-readable storage medium of claim 22, wherein during the join operation, the head thread merges the speculative version of the stack into the primary version of the stack while the speculative thread merges the space-time dimensioned versions of the memory elements into the primary versions of the memory elements.

24. The computer-readable storage medium of claim 22, wherein the head thread continues executing the program as a pseudo-head thread that operates on the space-time dimensioned versions of the memory elements using the speculative version of the stack while the speculative thread merges the space-time dimensioned versions of the memory elements into the primary versions of the memory elements.

25. An computer system that facilitates a parallel join operation to merge state created during speculative execution into the non-speculative state of a program during space and time dimensional program execution, comprising:

a processor;

a memory;

an operating system;

a head thread within the operating system that executes program instructions, the head thread operating on primary versions of memory elements and accessing a primary version of a stack;

a speculative thread within the operating system that executes program instructions in advance of the head thread while the head thread is executing, the speculative thread operating on space-time dimensioned versions of the memory elements and accessing a speculative version of the stack;

a join mechanism within the operating system that performs a join operation between the head thread and the speculative thread when the head thread reaches a point in the program where the speculative thread began executing, the join mechanism being configured to perform operations in parallel using both the head thread and the speculative thread, the operations including, merging the space-time dimensioned versions of the memory elements into the primary versions of the memory elements so that updates to the space-time dimensioned versions of the memory elements are incorporated into corresponding primary versions of memory elements, and merging the speculative version of the stack into the primary version of the stack.

* * * * *